Patented May 29, 1934

1,960,265

UNITED STATES PATENT OFFICE 1,960,265

ADHESIVE COMPOSITION

Russell L. Jenkins, Anniston, Ala., assignor to Swann Research, Incorporated, a corporation of Alabama No Drawing. Application February 25, 1932, Serial No. 595,223

18 Claims. (Cl. 87—17)

This invention relates to an improved, water resistant, self-healing adhesive.

One object of this invention is to provide a composition of matter which can be used for general adhesive purposes. Another object is to provide an adhesive composition which is insoluble in water or in aqueous liquids generally, but is soluble in the common organic solvents. Another object is to provide an adhesive composition which shall be tasteless and odorless and which may be used for paper products such as food containers and the like. A further object of my invention is to provide an adhesive which shall be particularly adapted for cementing cellulosic bodies, such as paper, wood, cotton, or textile fibers, or regenerated cellulosic bodies such as cellophane together, as well as one which shall be adapted to the cementing of metallic or ceramic bodies.

It is well understood in the art that difficulties have been encountered in obtaining an adhesive suitable for these purposes due to the fact that most of the bodies of this nature exhibit little adhesiveness for cellulosic or regenerated cellulosic bodies such as varnished paper, moisture-proof cellophane and the like and that furthermore those bodies which possess sufficient adhesiveness have a pronounced odor or taste which is readily transmitted to the food with which it may come in contact. A further difficulty with the known compositions is that a self-healing composition, which might be suitable, as far as the above mentioned difficulties are concerned, is at present unknown.

I have now discovered that certain chlorinated polyphenyl hydrocarbons having two or more closed chains when admixed with a plasticizing body or softening agent possess the proper degree of adhesiveness as well as the desirable odorless and self-healing properties above mentioned.

I have further discovered that chlorinated diphenyl or chlorinated polyphenyls or mixtures of these bodies may be combined with plasticizers or softening agents such as dibutyl phthalate, castor oil, tricresyl phosphate, butyl propionate, butyl tartrate, paraffin wax, diamyl phthalate, heavy refined mineral oil, or other well known plasticizers, and substantially odorless and tasteless self-healing compositions obtained showing good adhesiveness.

One form of my invention consists in incorporating with chlorinated diphenyl of more than 60 percent chlorine, several percent, usually 1 to 20, of a softening agent or plasticizing body as above set out. This can be done by dissolving both bodies in a common solvent such as carbon tetrachloride, benzol, toluol. Usually equal parts of said solvent and said chlorinated diphenyl may be used, although the proportions may be widely varied. The solution thus prepared may be useful for applying the adhesive directly to the bodies to be joined together, application of the solvent mixture being made directly and the solvent allowed to evaporate. Another method of compounding the adhesive is to melt the chlorinated diphenyl and then stir in the plasticizing body. The amount of plasticizing body may be varied over wide limits, and while usually between 2 and 10% will be found sufficient, some uses will require lesser or greater amounts.

In compounding my improved adhesive I may also employ other chlorinated polyphenyl hydrocarbons as the chlorinated body, particularly those polyphenyl hydrocarbons produced as a by-product during the thermal synthesis of diphenyl. Such a by-product has been found to consist mainly in a mixture of the ortho, meta, paraphenyl diphenyl, triphenylene and dibiphenyl in various proportions. These bodies are herein collectively referred to as polyphenyls. The by-product comprised of these hydrocarbons, when distilled, consists of a yellow crystalline wax, and may be chlorinated to varying degrees using an appropriate catalyst. After chlorination the bodies are washed free of hydrochloric acid and used directly as such or they may be distilled and compositions of light yellow color and non-crystalline character obtained.

In this form they may be mixed with a plasticizing body or softening agent as above described and the adhesive composition thereby obtained.

My invention will be more completely understood by reference to the following specific examples:—

Example I

Both the diphenyl and the mixed polyphenyl hydrocarbons used in my composition may be obtained by thermal synthesis from benzol, said synthesis being preferably carried out as described in French Pat. No. 667,840. In the recovery of the diphenyl as produced by this synthesis a distillation is resorted to, the diphenyl being obtained from the pyrolysis product by carrying the distillation temperature up to 270° C. The residue after the diphenyl has been removed is composed of various complex higher boiling bodies herein referred to as polyphenyls. These complex hydrocarbon bodies or polyphenyls may be distilled at atmospheric pressure by further raising the temperature during distillation up to and above 400° C. A sample of these polyphenyls which had been distilled at atmospheric pressure was found to contain the following definite compounds:—

|  | Percent |
|---|---|
| 1, 2 diphenyl benzene | 4.3 |
| 1, 3 diphenyl benzene | 58.8 |
| 1, 4 diphenyl benzene | 29.5 |
| Ortho-triphenylene | 1.1 |
| Unidentified (dibiphenyl etc.) | 6.3 |

The above distillable fraction composed approximately 80% of the total high boiling bodies, the remaining 20% being, however, distillable in greater or less amount at less than atmospheric pressure.

For the purpose of this example, the chlorination of a mass of the above particularly mentioned high boiling bodies will be further described. Chlorination is effected in well known manner with the aid of chlorine gas, an iron catalyst being used to accelerate this reaction. When the mass has absorbed 40 to 45 percent, say 42 percent of chlorine, chlorination is stopped and the product washed to remove free acid and iron chlorides and then distilled. Such distillation is continued until 85 to 95 percent has been distilled, the product being a light yellow transparent somewhat brittle and plastic mass, having a softening point in the neighborhood of 53 to 77° C. as determined by the Barrett ball and ring method.

In compounding my adhesive I melt together 94 parts of the above distilled chlorinated polyphenyls containing say 42 percent of chlorine and 6 percent of a plasticizing body such as, for example, dibutyl phthalate. It may be applied as an adhesive either in the molten state thus obtained or it may be compounded by dissolving the above ingredients in a volatile hydrocarbon solvent such as benzol, and applied in this form. Considerable variation is permissible in the proportion of chlorinated polyphenyl and plasticizer used, the effect of increasing amounts of dibutyl phthalate or other plasticizer being to increase the softness and tackiness of the product.

*Example II*

If an adhesive body of higher melting point is desired for applications where the objects cemented together are to be subjected to a higher temperature, I preferably chlorinate the above mentioned polyphenyls to a higher chlorine content, say in the neighborhood of 60 to 63% chlorine. Such a body will have a softening point in the neighborhood of 125° C. and may be mixed with dibutyl phthalate, the final product containing 8% of this plasticizer, in the manner described in Example I above. Various intermediate softening points may be obtained by introducing less chlorine.

*Example III*

The melting point of the adhesive body may be further changed by incorporating with the polyphenyls mentioned in Example I above, before chlorinating, a certain proportion of diphenyl. For most purposes I prefer to mix say 60 parts of technical diphenyl with 40 parts of polyphenyls having a boiling range of from say 270° C. to 400° C. This mixture of hydrocarbons is chlorinated to a chlorine content of about 65% using iron as a catalyst as before described and the black non-crystalline brittle body obtained is then distilled in a vacuum. The clear yellow non-crystalline material thus obtained, which will have a softening point in the neighborhood of 75° C., as determined by the Barrett ball and ring test, is now mixed with a plasticizing body in the proportion of 96 parts of the chlorinated body to 4 parts of the plasticizing body, said dibutyl phthalate, tricresyl phosphate or castor oil, the mixing taking place as described under Example I above. Application of the adhesive may be made directly by warming or from a suitable solvent.

By varying the proportion of polyphenyls and diphenyls, as well as the chlorine content of the mixture, considerable variation in such properties as softening point may be achieved. In general it may be said that chlorination of these bodies should be restricted to ranges wherein no crystallization takes place. By employing varying percentages of the polyphenyl bodies and diphenyl non-crystalline resinous products may be obtained having softening points varying all the way from below 50° C. to above 125° C. The advantages of such a range of softening points will be evident to those skilled in the art.

The above examples illustrate several ways in which my improved adhesive may be produced and how it may be used. I have found it to be particularly valuable in cementing cellulosic bodies or regenerated cellulosic bodies such as paper, wood, cotton, or other textile fibers, metallic or ceramic bodies, etc. It is also of value in cementing cellophane or moisture-proof cellophane articles to paper, cloth, or other fibrous bodies or in attaching celluloid sheets to glass.

My adhesive body as herein described is a sticky, self-healing thermo-plastic water-insoluble body, clear, transparent, and light yellow when distilled chlorinated polyphenyls or diphenyls are employed in its formulation and brown to black when the chlorinated bodies are utilized in their undistilled condition. They are soluble in the ordinary organic solvents such as carbon tetrachloride, benzol, toluol, gasoline, etc., in which form they may be applied if desired. They also exhibit self-healing properties, that is, if the adhesive union formed by my adhesive composition is broken, the parts may be pressed together and reformation of the bond will take place. In most cases this reformation can be aided by slightly warming the joint.

In the production and use of my adhesive composition attention should be given when selecting the plasticizing body or softening agent, to the particular use for which the product containing same is designed. For example because of its poisonous nature it is undesirable to use tricresyl phosphate when the adhesive is to enter into compositions coming into contact with food stuffs, for example when it is used in cementing liners in bottle or jar caps.

While I have described several embodiments of my invention, it will be apparent to those skilled in the art that it is not so limited but that it is susceptible of various changes and modifications without departing from the spirit thereof, and I desire therefore that only such limitations shall be placed thereupon as may be imposed by the prior art or as are specifically set forth in the appended claims.

What I claim is:—

1. An adhesive composition which is thermoplastic, self-healing and substantially odorless and tasteless, soluble in benzol and toluol and which contains chlorinated polyphenyls as a principal ingredient.

2. An adhesive composition which is thermoplastic and substantially odorless, soluble in benzol and which contains chlorinated diphenyl as a principal ingredient.

3. An adhesive composition which is thermoplastic and self-healing, soluble in benzol and toluol and which contains chlorinated polyphenyls averaging more than 42 percent of chlorine as a principal ingredient.

4. An adhesive composition which is thermoplastic and self-healing, which is soluble in benzol and toluol and which contains chlorinated diphenyl with more than 60% of chlorine.

5. An adhesive composition which is thermoplastic and self-healing, soluble in benzol and toluol and which contains chlorinated diphenyl and chlorinated polyphenyls, said chlorinated bodies averaging more than 60 percent chlorine content and a softening agent associated therewith.

6. An adhesive composition which is thermoplastic and self-healing, soluble in benzol and toluol and which contains a chlorinated mixture of diphenyl and polyphenyl, said chlorinated mixture having a softening point in the range of 70 to 80° C., together with a softening agent.

7. An adhesive composition which is thermoplastic and odorless, soluble in common hydrocarbon solvents and which contains between 90 and 98 percent of chlorinated polyphenyls, said chlorinated polyphenyls containing above 42 percent of chlorine, together with 10 to 2 percent of a softening agent.

8. An adhesive composition which is thermoplastic and odorless, soluble in common hydrocarbon solvents and which contains between 80 and 99 percent of chlorinated polyphenyls, said chlorinated polyphenyls containing above 42 percent of chlorine, together with 20 to 1 percent of dibutyl phthalate.

9. An adhesive composition which is thermoplastic and substantially odorless, soluble in the common hydrocarbon solvents and which contains between 90 and 98 percent of chlorinated diphenyl of more than 60 percent chlorine content together with 10 to 2 percent of dibutyl phthalate.

10. An adhesive composition which is thermoplastic and odorless and soluble in benzol and which contains a chlorinated mixture of polyphenyls, said chlorinated mixture having a softening point in the range of 70 to 125° C., together with a softening agent.

11. An adhesive composition which is thermoplastic and odorless, soluble in benzol and which contains 80 to 99 parts of a chlorinated mixture of polyphenyls, having a softening point in the range of 53 to 125° C., together with 20 to 1 parts of a softening agent.

12. An adhesive composition which is thermoplastic and odorless, soluble in benzol and which contains 80 to 99 parts of a chlorinated mixture of polyphenyls and diphenyl, said mixture having a softening point in the range of 53 to 125° C., together with 20 to 1 parts of a softening agent.

13. An adhesive composition which is thermoplastic and substantially odorless and soluble in benzol and which contains 80 to 99 parts of a chlorinated mixture of polyphenyls and diphenyl, said mixture having a softening point in the range of 53 to 125° C., together with 20 to 1 parts of tricresyl phosphate.

14. An adhesive composition which is thermoplastic, substantially odorless, self-healing and which can be applied in solution in the ordinary hydrocarbon solvents comprised of 90 to 98 parts of a chlorinated mixture of polyphenyls and diphenyl, said chlorinated mixture having a softening point in the range of 53 to 125° C., together with 10 to 2 parts of castor oil.

15. An adhesive composition which is thermoplastic, odorless, self-healing and which consists of a chlorinated mixture of polyphenyls, said chlorinated mixture having a softening point in the range of 53 to 125° C., together with a plasticizer selected from the group including dibutyl phthalate, castor oil, tricresyl phosphate, butyl propionate, butyl tartrate, paraffin wax, purified mineral oil, diamyl phthalate.

16. An adhesive composition which is thermoplastic, odorless, self-healing and which consists of a chlorinated mixture of polyphenyls and diphenyl, said chlorinated mixture having a softening point in the range of 70 to 80° C., together with a plasticizer selected from the group including dibutyl phthalate, castor oil, tricresyl phosphate, butyl propionate, butyl tartrate, paraffin wax, purified mineral oil, diamyl phthalate.

17. A waterproof adhesive containing a chlorinated diphenyl as a principal ingredient.

18. A waterproof adhesive comprising a chlorinated polyphenyl and a substance effective to render said chlorinated polyphenyl plastic.

RUSSELL L. JENKINS.